3,355,487
PREPARATION AND PURIFICATION OF CHLORENDIC ACID FROM HEXACHLOROCYCLOPENTADIENE AND MALEIC ANHYDRIDE IN A DIELS-ALDER CONDENSATION
Richard H. Kimball, Lewiston, N.Y., assignor to Hooker Chemical Corporation, Niagara Falls, N.Y., a corporation of New York
Filed Sept. 19, 1962, Ser. No. 224,800
16 Claims. (Cl. 260—514)

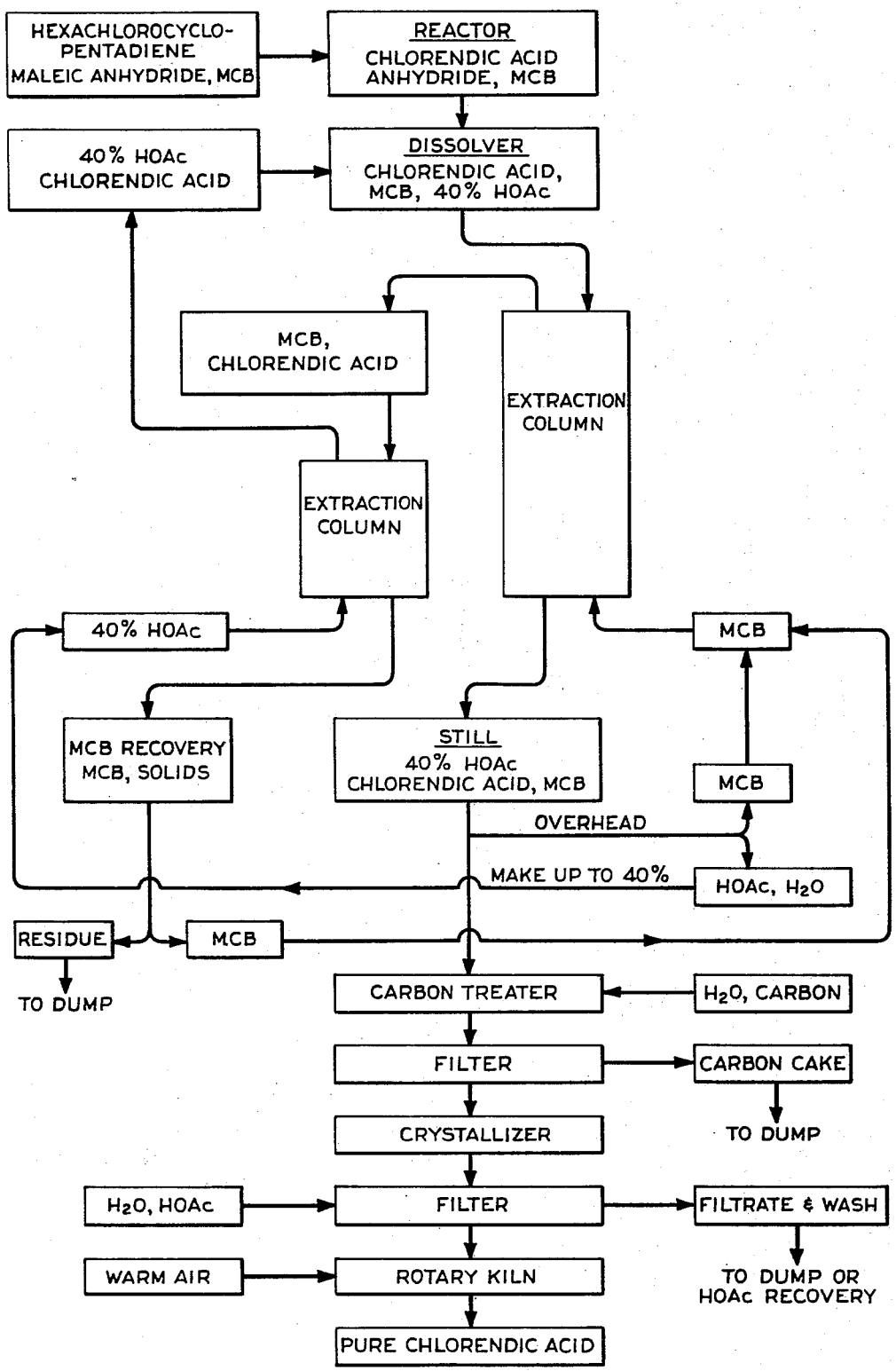

This invention relates to improvements in the manufacture of 1,4,5,6,7,7-hexachlorobicyclo - (2.2.1)-5-heptene-2,3-dicarboxylic acid, and more particularly it relates to improvements in the method for the purification of this material.

1,4,5,6,7,7-hexachlorobicyclo - (2.2.1) - 5-heptene-2,3-dicarboxylic acid is known in the art as chlorendic acid. Accordingly, for purposes of brevity, this material will be referred to hereinafter as "chlorendic acid."

It is known that chlorendic acid is a valuable material for use in the production of difficulty inflammable polyester resins. For such purposes, it is desirable if the chlorendic acid is substantially free from impurities and is of a uniformly light color. Accordingly, considerable effort has been expended up to the present time to develop processes whereby chlorendic acid having the desired degree of purity can be easily and economically produced.

In the preparation of chlorendic acid, a Diels-Alder condensation is effected between hexachlorocyclopentadiene and maleic anhydride to produce the chlorendic acid anhydride. Generally, this reaction is carried out in the presence of a small amount of a solvent which will maintain the reaction product of the chlorendic acid anhydride in the liquid state. Thereafter, the chlorendic acid anhydride is hydrolyzed in water to chlorendic acid which material is then separated, generally by crystallization. The resulting chlorendic acid product, however, is sufficiently impure as to be unsuitable for use in making many polyester resins, particularly the high grade, light-colored polyester resins.

Accordingly, in the past, it has been the practice to subject the crude chlorendic acid product to multiple recrystallizations from water or from an organic solvent, such as toluene. Although by such methods, a substantially pure chlorendic acid can be produced, it is apparent that the numerous recrystallizations required to effect this purity are both time consuming and expensive. Additionally, the use of such multiple recrystallizations necessitates the processing and handling of the chlorendic acid in solid form. This not only makes the operation of the process more difficult but also adds further to the cost. Accordingly, the methods which have heretofore been used for obtaining a substantially pure chlorendic acid have not been completely satisfactory.

It is, therefore, an object of the present invention to provide a method whereby chlorendic acid can be produced in a substantially pure form.

Another object of the present invention is to provide a method for producing substantially pure chlorendic acid, which method may be operated easily and economically.

A further object of the present invention is to provide a process wherein chlorendic acid may be purified, which process is carried out in its entirety while maintaining the chlorendic acid in the liquid state.

These and other objects will become apparent to those skilled in the art from the description of the invention which follows.

The drawing which is attached hereto and forms a part hereof is a schematic flow diagram of a preferred embodiment of the process of the present invention.

The method of the present invention envisions dissolving an impure chlorendic acid anhydride in an aqueous solution of a concentrated acetic acid, thereby effecting hydrolysis of the anhydride to chlorendic acid, maintaining the resulting impure chlorendic acid in solution in the concentrated acetic acid, countercurrently contacting the resulting solution of impure chlorendic acid in the acetic acid with monochlorobenzene so as to extract the major portion of the impurities from the chlorendic acid into the monochlorobenzene, separating the chlorendic acid solution from the monochlorobenzene, diluting the chlorendic acid solution to an acetic acid concentration below about 28 percent by weight and thereafter crystallizing a purified chlorendic acid from the solution.

By the use of this process, a chlorenic acid is produced which is low in impurities and which is of a uniformly light color. This chlorendic acid has been found to be very well suited for use in producing difficultly inflammable polyester resins of all types, including high grade, light-colored polyester resins. Moreover, during the entire process, the chlorendic acid is maintained in the liquid state, until the purified product is crystallized out, thus eliminating the necessity for handling a solid product during purification.

More specifically, in the practice of the present method, the chlorendic acid anhydride is formed by a Diels-Alder type condensation of hexachlorocyclopentadiene and maleic anhydride. Preferably, this condensation is effected in the presence of small amounts of an organic solvent so that the resulting chlorendic acid anhydride product is maintained in the liquid state. Exemplary of the organic solvents which may be used are monochlorobenzene, cyclohexane, substituted cyclohexanes, such as methylcyclohexane, ethylcyclohexane and the like, and decahydronaphthalene. Additionally, numerous other organic solvents may be used. Of the above, because of its stability, the preferred organic solvent is monochlorobenzene.

The chlorendic acid anhydride which results from the above condensation contains numerous impurities, including unreacted hexachlorocyclopentadiene, maleic anhydride, as well as highly colored organic by-products of the condensation reaction.

To effect the formation of the chlorendic acid from the chlorendic acid anhydride by the present process, the solution of the anhydride which results from the Diels-Alder condensation is dissolved in a concentrated aqueous solution of acetic acid. In this manner, hydrolysis of the anhydride to chlorendic acid is effected and a solution of chlorendic acid in aqueous acetic acid is formed. This solution of chlorendic acid is maintained during the subsequent extraction portion of the process.

The concentration of the acetic acid used to dissolve the chlorendic acid anhydride, has been found to be quite important. While it is true that hydrolysis of the chlorendic acid hydride may be accomplished in acetic acid of any concentration provided it contains at least one molecule of water per molecule of chlorendic acid anhydride to be hydrolyzed, it has been found that several advantages are obtained by operating with a stronger concentration of acetic acid, particularly in view of the fact that the dissolving of the chlorendic acid anhydride is followed by an extraction of the impurities from the chlorendic acid formed using monochlorobenzene.

In this regard, it has been found that as the concentration of the acetic acid is increased, more of the chlorendic acid remains in the acetic acid and less is dissolved in the monochlorobenzene used to extract the impurities from the chlorendic acid. For example, when 10 percent acetic acid is used, substantially all of the chlorendic acid is in the monochlorobenzene extractant, along with the impurities. When the acetic acid used is of a concentration of about 24–25 percent, about half of the chlorendic acid is dissolved in the monochlorobenzene with half remaining in the acetic acid. In contrast, however, when the concentration of the acetic acid is in excess of about 28 percent by weight, e.g., 30–40 percent by weight, only about 10 percent or less of the chlorendic acid is dissolved in the monochlorobenzene with the impurities.

Another advantage obtained by using the more concentrated acetic acid to dissolve the chlorendic acid anhydride is that as the concentration of the acetic acid is increased, the total volume of liquids in the system required to process a given amount of the chlorendic acid is decreased. For example, to process 50 grams of chlorendic acid using 25 percent acetic acid requires a system volume, made up of acetic acid, water, and monochlorobenzene of 218 ml. In contrast, when the acetic acid concentration is 28 percent, the total system volume required to process 50 grams of the chlorendic acid is only 158 ml. Similarly, when acetic acid of a concentration of 40 percent is used the system volume required to process 50 grams of chlorendic acid is only 150 ml.

A further advantage which is obtained by using higher concentrations of acetic acid is that the system becomes much more stable and less sensitive to variations in temperature, volume, and concentration of components, which are likely to occur during the operation of a commercial process. For example, it has been found that temperature variations, which have a very great effect on the system when the acetic acid used has a concentration of 25 percent, have virtually no effect on the system when the acetic acid used has a concentration of 40 percent. In the latter system, it has been found that the chlorendic acid can be processed at a temperature anywhere from room temperature up to the boiling point of the solution i.e., about 90 degrees centigrade.

It is for the above reasons that it is preferred to use concentrated acetic acid to dissolve the chlorendic acid anhydride. More specifically, it is preferred that the acetic acid have a concentration in excess of about 28 percent, with a concentration of about 40 percent being specifically preferred. It is to be noted, that although acid concentrations in excess of about 40 percent can be used, with no detrimental effect on the system, the amount of improvement obtained when using more concentrated acids, over that obtained when using 40 percent acetic acid is sufficiently small that the added cost of the more concentrated acid offsets the additional advantages obtained. For this reason, acetic acid concentrations in excess of about 40 percent will generally not be used in the commercial operation of the present process.

The acetic acid used will be at least that amount which is necessary to provide sufficient water to effect hydrolysis of the chlorendic acid anhydride in the aqueous acetic acid and maintain the resulting chlorendic acid in solution.

Once the chlorendic acid has been formed and is dissolved in the aqueous acetic acid, the impurities present in the chlorendic acid are removed by countercurrently contacting the acetic acid solution of the chlorendic acid with monochlorobenzene. The amount of monochlorobenzene used to effect this countercurrent extraction will, of course, vary with the efficiency of the extracting equipment. The minimum amount of monochlorobenzene required, in practice, will be at least that which is sufficient to extract a substantial amount of the impurities from the chlorendic acid. No limit has been found as to the maximum amount of monochlorobenzene which may be used although, of course, for reasons of economy, large excesses will not be used.

As has been noted hereinabove, in the preparation of the chlorendic acid anhydride, the condensation of the hexachlorocyclopentadiene and maleic anhydride is carried out in the presence of a small amount of an organic solvent. The organic solvent used in the condensation is preferably the same as that used for the extraction, i.e., monochlorobenzene. In this manner, the use of two organic solvents in the process and the ensuing more complicated recovery system required for two solvents is eliminated. It is to be appreciated, however, that the use of a common organic solvent during the condensation reaction to form the chlorendic acid anhydride and in the extraction of the chlorendic acid, is merely a preferred embodiment of the present invention and that two different solvents may be used if desired.

After the acetic acid solution of the chlorendic acid has been extracted by countercurrent contact with the monochlorobenzene, the solution is preferably subjected to distillation so as to remove any of the monochlorobenzene which may be with the chlorendic acid. This distillation is carried out for a sufficient period of time that substantially all of the monochlorobenzene is removed from the chlorendic acid solution, as well as appreciable quantities of water and some of the acetic acid. Thereafter, sufficient water is then added to the chlorendic acid solution so as to dilute the acetic acid in the solution to a concentration which is not in excess of about 28 percent by weight. Preferably, the amount of water added is sufficient to provide an acetic acid concentration in the solution in the range of about 10 to 15 percent by weight. At this portion in the process, if desired, the chlorendic acid solution may be subjected to a decolorizing treatment. This is effected by adding a decoloring agent such as activated carbon, with the water which is used to dilute the chlorendic acid solution. In carrying out the decolorizing treatment, the decoloring agent, such as activated carbon, is added to the solution in the amount of about 1 percent by weight of the chlorendic acid present. Additionally, any one of the common filter aids may also be added to the solution, generally in an amount of about 0.5 percent by weight of the chlorendic acid present. The solution, containing the activated carbon and filter aid is maintained at an elevated temperature, e.g., 90–95 degrees centigrade for a period of about 1 hour. During this time, the solution is stirred. Thereafter, the solids in the solution are removed, preferably by filtration, the filtration being carried out while the solution is maintained at the elevated temperature. It is to be noted that it is important that the solution be maintained at an elevated temperature during the filtration, which temperature is in excess of about 60 degrees centigrade. In this manner, crystallization of the chlorendic acid in the solution is prevented so that there is substantially no loss of chlorendic acid product during the filtration of the solution to remove the solids.

After the hot filtration of the chlorendic acid solution has been completed, the solution is cooled to a temperature of about 10 degrees centigrade. Crystallization of the chlorendic acid begins when the temperature of the solution has been reduced to about 45 degrees centigrade and the bulk of the chlorendic acid has separated from the solution in small granular, shining prisms of the chlorendic acid monohydrate, by the time the solution temperature has been reduced to about room temperature, i.e., 20–25 degrees centigrade. The thus-formed crystals of the chlorendic acid monohydrate are then separated from the solution in any convenient manner, for example, by filtration and washed. Generally, the thus-separated crystals are then dried, to remove any surface water as well as any remaining traces of acetic acid. This drying may be effected in any convenient manner, as by passing a stream of air over the crystals. At room temperature, unless the air is exceptionally dry, substantially no loss of the water of hydration takes place. The thus-formed chlorendic acid monohydrate is dry and free-flowing, and shows no tendency whatsoever to cake even on long storage.

The chlorendic acid monohydrate may be subjected to drying at elevated temperatures as for example temperatures up to about 100 degrees centigrade. In this manner, the water of hydration is removed from the chlorendic acid, forming an anhydrous chlorendic acid. Preferably, this operation is carried out by heating the chlorendic acid monohydrate crystals in a kiln maintained at a temperature within the range of about 60–80 degrees centigrade. The formation of the anhydrous chlorendic acid under these conditions is effected quickly, with substantially no dusting or crumbling of the crystals. The anhydrous chlorendic acid produced in this manner is found to have a purity of 99.6 to 99.9 percent.

If it is desired, the monochlorobenzene which is used to extract the impurities from the chlorendic acid solution, after being removed from contact with this solution, may be subjected to additional treatment so as to recover the monochlorobenzene. This monochlorobenzene contains small amounts of the chlorendic acid as well as small amounts of acetic acid. These materials may be removed from the monochlorobenzene by countercurrent contact of the monochlorobenzene solution with a concentrated solution of acetic acid. The acetic acid solution used for this purpose will generally be of the same concentration as that used in dissolving of the chlorendic acid anhydride. After extraction of the monochlorobenzene with the concentrated acetic acid, the monochlorobenzene may then be subjected to additional treatments to remove other impurities and solid residues, in a manner well known to those in the art. The thus-recovered monochlorobenzene may then be recycled to the extraction column for use in extracting the impurities in additional quantities of the chlorendic acid solution.

The concentrated acetic acid used to extract the chlorendic acid from the monochlorobenzene may then be returned to the dissolving portion of the process wherein it is used to dissolve additional quantities of the chlorendic acid anhydride. The quantities of chlorendic acid contained in this acetic acid are thus carried back into the process, thereby maintaining the losses of the chlorendic acid at a minimum.

The distillate obtained from the distillation of the chlorendic acid solution following the extraction with the monochlorobenzene, may also be subjected to additional processing so as to recover the monochlorobenzene and acetic acid which are distilled off from the chlorendic acid solution. The acetic acid recovered from the distillate may, if desired, be brought to a concentration of about 40 percent by weight, and recycled for use in extracting the monochlorobenzene. The monochlorobenzene recovered from the distillate may then be returned for use in extracting additional quantities of chlorendic acid. By operating the present process in the above manner, it is seen that the monochlorobenzene losses as well as the acetic acid losses, are reduced to a minimum, thus insuring a more economical operation of the process.

Referring now to the drawing, hexachlorocyclopentadiene, maleic anhydride, and monochlorobenzene are added to a reactor. Within the reactor, a solution of chlorendic acid anhydride in monochlorobenzene is formed. This solution is removed from the reactor and passed into a dissolver wherein it is brought into contact with a 40 percent by weight solution of acetic acid, containing some chlorendic acid from a previous run. Within the dissolver, the chlorendic acid anhydride is hydrolyzed by the acetic acid solution to chlorendic acid. From the dissolver, the solution of acetic acid, chlorendic acid, and monochlorobenzene are passed into an extraction column wherein the solution is brought into countercurrent contact with monochlorobenzene. The solution of chlorendic acid, is introduced into the top of the extraction column while the monochlorobenzene is introduced into the bottom of the column. The monochlorobenzene which is removed from the top of the extraction column contains some chlorendic acid, as well as a substantial portion of the impurities from the chlorendic acid. This solution is then passed into the top of a second extraction column where it is brought into countercurrent contact with a 40 percent acetic acid solution, introduced into the bottom of the column. Within this column, the chlorendic acid in the monochlorobenzene is extracted by the acetic acid, the solution of the acetic acid and chlorendic acid is removed from the top of the column and is then passed back into the dissolver to dissolve additional quantities of the chlorendic acid anhydride. The monochlorobenzene from which the chlorendic acid has been stripped by the acetic acid is then directed to the monochlorobenzene recovery system wherein the impurities are removed from the monochlorobenzene and dumped while the thus-purified monochlorobenzene is directed back to the extraction column for use in extracting impurities from additional quantities of chlorendic acid.

The chlorendic acid solution in acetic acid removed from the bottom of the first extraction column contains some monochlorobenzene. This solution is directed to a still wherein the solution is subjected to distillation so as to remove substantially all of the monochlorobenzene from the solution as well as large amount of water and small quantities of the acetic acid. The distillate from the still is then subjected to treatment so as to separate the monochlorobenzene and the acetic acid, the monochlorobenzene being returned to the bottom of the extraction column while the acetic acid is made up to a concentration of about 40 percent by weight and returned to the bottom of the second extraction column.

The residue from the still, which is the solution of chlorendic acid and concentrated acetic acid, is then passed into the carbon treater wherein decolorizing carbon is added to the solution. Additionally, sufficient water is added to the solution in the carbon treater so as to effect a dilution of the acetic acid in the solution to a concentration which is below about 28 percent by weight. From the carbon treater, the solution is passed through a filter wherein the carbon is removed and then dumped. The filtrate is then passed into a crystallizer wherein it is cooled to a sufficiently low temperature to effect crystallization of the chlorendic acid from the solution. From the crystallizer, the slurry of chlorendic acid crystals is passed into a second filter wherein separation of the solids from the liquid is effected. Within this filter, the solids are washed several times and the filtrate and washings removed and thereafter dumped or further treated for recovery of acetic acid. From the second filter, the crystals of chlorendic acid are passed into a rotary kiln wherein the surface water is removed from the crystals. Where the air introduced into the kiln is substantially at room temperature, the product will be a substantially pure chlorendic acid monohydrate. It will be appreciated, however, that by increasing the temperature of the air used in the kiln, substantially pure anhydrous chlorendic acid crystals can be obtained rather than the monohydrate.

When the process of the present invention is carried out in the manner as has been described, the product is a substantially pure chlorendic acid, either in the form of the monohydrate or as anhydrous chlorendic acid, which material is of a uniformly light color and quite suitable for use in making high grade, light-colored polyester resins. Additionally, the difficulties of the prior art processes wherein handling of solid chlorendic acid during the purification is required have been eliminated by maintaining the chlorendic acid in the liquid state during the present process. It will further be appreciated that although specific reference has been made hereinabove to acetic acid and monochlorobenzene, other equivalent acids and solvents may also be used in the present process.

In order that those skilled in the art may better understand the present invention and the manner in which it may be practiced, the following specific examples are given.

A series of experiments are run wherein chlorendic anhydride is dissolved and hydrolyzed in acetic acid of varying concentration and the resulting solution of chlorendic acid in aqueous acetic acid is then extracted with monochlorobenzene. The chlorendic acid anhydride for use in these examples was prepared in the following manner:

162.5 grams of commercial grade monochlorobenzene and 325 grams of commercial grade maleic anhydride were charged to a two liter, three-necked flask fitted with a thermometer, a reflux condenser and motor driven sweep stirrer. The flask was heated to a temperature of 140 degrees centigrade. From a graduated dropping funnel, 25 ml. (42.8 grams) of hexachlorocyclopentadiene of 96.4 percent purity was added to the reactor. Thereafter, the hexachlorocyclopentadiene was added dropwise to the reactor at the rate of 5–8 ml. (8–14 grams) per minute, until a total of 103 grams had been added. Thereafter, the rate of dropwise addition was increased to 8–10 ml. (14–17 grams) per minute until a total of 933.2 grams of the hexachlorocyclopentadiene had been added. During the addition of the hexachlorocyclopentadiene, the temperature in the reactor was held in the range of about 136–150 degrees centigrade. The total volume in the flask after the addition of the hexachlorocyclopentadiene was completed was 950 ml. The reaction flask was then held at a temperature of about 150 degrees centigrade for about 10 hours at the end of which time the condensation of the maleic anhydride and the hexachlorocyclopentadiene to the chlorendic anhydride was found to be about substantially complete.

Several portions of the above reaction product, each containing approximately 50 grams of the chlorendic acid anhydride, were then dissolved in acetic acid of varying concentrations. The resulting solutions of chlorendic acid in acetic acid were then extracted with monochlorobenzene using a laboratory separatory funnel. The monochlorobenzene was added to the solution of chlorendic acid and acetic acid in the funnel, the funnel was agitated and then the contents were permitted to separate into two layers. The volume of each layer was then measured and the amount of chlorendic acid in each layer was determined. Using this procedure, the following results were obtained:

three hours, while maintaining the reactants at a temperature within the range of about 140–145 degrees centigrade. The reactor was maintained at this temperature for a period of about 8 hours at the end of which time the reactor was found to contain 2,402 pounds of chlorendic acid anhydride and 35 gallons of monochlorobenzene, making up a total volume in the reactor of 232 gallons. From the reactor, this solution was transferred to the dissolver wherein there was added a solution containing 386 pounds of chlorendic acid and 432 gallons of 40 percent acetic acid. Within the dissolver, the chlorendic acid anhydride was hydrolyzed in the concentrated acetic acid and there is formed a solution containing 2,906 pounds of chlorendic acid, 35 gallons of monochlorobenzene and 418 gallons of 40 percent acetic acid, making up a total volume in the dissolver of 668 gallons. This solution was then introduced into the top of an extraction column and is countercurrently contacted with a stream of monochlorobenzene, in the amount of 514 gallons introduced into the bottom of the extraction column. From the top of the extraction column there is removed a solution containing 386 pounds of the chlorendic acid, 398 gallons of the monochlorobenzene, 17 gallons of the 40 percent acetic acid, making up a total of 439 gallons. This solution is then introduced into the top of a second extraction column, and is countercurrently contacted with a solution containing 432 gallons of 40 percent acetic acid, introduced into the bottom of the second extraction column. From the bottom of this extraction column is recovered a solution containing 27 pounds of solids, 398 pounds of monochlorobenzene, and 17 gallons of 40 percent acetic acid, which solution is directed to a monochlorobenzene recovery system wherein substantially all of the monochlorobenzene present in the solution is recovered and recycled for introduction into the bottom of the first extraction column. From the top of the second extraction column there is recovered a solution containing substantially all of the chlorendic acid and acetic acid, which solution is reintroduced into the dissolver so that the acetic acid solution may be used to dissolve additional quantities of the chlorendic acid anhydride.

From the bottom of the first extraction column there is recovered a solution containing 2,520 pounds of chlorendic acid, 151 gallons of monochlorobenzene and 401 gallons of 40 percent acetic acid, making up a total amount of 732 gallons. This solution is introduced into a still wherein it is subjected to distillation until all of the monochlorobenzene has been removed from the solution. The complete removal of the monochlorobenzene is indicated when the distillate collected from the still no longer separates into two separate layers. The distillate from the still is found to contain 180 gallons of 40 percent acetic acid, and 151 gallons of monochlorobenzene. A separation is effected between the monochlorobenzene and the acetic acid solution, the monochlorobenzene being returned to the bottom of the first extraction column and the acetic acid solution being returned to the bottom of the second extraction column.

From the still, there is obtained a solution containing 2,520 pounds of chlorendic acid and 225 gallons of an

| Example | Chlorendic acid, grams | Aqueous HOAc | | MCB, vol.cc. | Lower layer nature vol. cc. | Upper layer nature, vol. cc. | Total, vol. cc. | Grams chlorendic acid in— | |
|---|---|---|---|---|---|---|---|---|---|
| | | Cc. | Vol. percent | | | | | MCB | HOAc |
| 1 | 50 | 125 | 10 | 10 | MCB, large | HOAc, small | | (¹) | (²) |
| 2 | 50 | 148 | 24 | 30 | MCB, 70 | HOAc, 143 | 213 | 27.4 | 21.8 |
| 3 | 50 | 150 | 25 | 60 | MCB, 50 | HOAc, 168 | 218 | 10.5 | 38 |
| 4 | 50 | 157 | 26 | 60 | HOAc | MCB (layers reversed) | | | |
| 5 | 50 | 85 | 28 | 65 | HOAc, 119 | MCB, 39 | 158 | 6.2 | 42 |
| 6 | 50 | 118 | 30 | 65 | HOAc, 156 | MCB, 29 | 185 | 5 | 45 |
| 7 | 50 | 63 | 40 | 63 | HOAc, 108 | MCB, 42 | 150 | 3.3 | 46.7 |

¹ Substantially all.  ² Very little.

From the above results, the improvements obtained from using the more concentrated acetic acids are clearly seen. These results show that as the concentration of the acetic acid is increased, the amount of the chlorendic acid in the acetic acid layer also increased, while the amount of chlorendic acid in the monochlorobenzene layer decreases. It is further seen that the total system volume liquid required to process a given amount of the chlorendic acid also decreases as the concentration of the acetic acid used increases.

*Example 8*

In this example, the process as set forth in the drawing and described in detail hereinabove is followed. In this process, 1,832 pounds of hexachlorocyclopentadiene are charged into a 500 gallon glass-lined reactor provided with a reflux condenser, agitation means and means for heating and cooling. The temperature in the reactor is raised to a temperature within the range of about 140–145 degrees centigrade and a molten mixture of 638 lbs. of maleic anhydride and 318 lbs. of monochlorobenzene are gradually charged into the reactor over a period of about aqueous solution of concentrated acetic acid. This solution is introduced into a carbon treater wherein 544 gallons of water are added as well as 26 pounds of activated carbon and 13 pounds of a filter aid. This makes up to a total volume of 950 gallons in the carbon treater. This solution is heated and stirred for about one hour at about 90 degrees centigrade. Thereafter, the solution is filtered and the carbon cake obtained is washed and removed. The filtrate is then passed into a crystallizer, which is maintained at a temperature of about 10 degrees centigrade, wherein the crystals of chlorendic acid monohydrate crystals are formed. From the crystallizer, the slurry of chlorendic acid monohydrate crystals are passed through a second filter wherein the crystals are removed. The crystal mass in this filter is then washed with a dilute acetic acid solution containing 12 gallons of acetic acid in 220 gallons of water, which solution is maintained at a temperature of about 5 degrees centigrade. The crystals are then washed again with 385 gallons of water. The filtrate and washings from this filter, which contain 106 pounds of chlorendic acid may, if desired, be directed to additional processing steps for recovery of the acetic acid and the chlorendic acid. From the filter, the mass of chlorendic acid monohydrate crystals are placed into a rotary kiln wherein they are contacted with warm air at a temperature of about 80 degrees centigrade. The crystals are maintained in the kiln and contacted with air until all of the surface water and water hydration have been removed. There is then recovered a total of 2,336 pounds of anhydrous chlorendic acid having a purity of about 99.7 percent and a color of about 10 (Hazen). This color was determined by dissolving 30 grams of the chlorendic acid in 17 ml. of acetone. The color of the solution was determined in an instrument such as the Taylor Water Analyzer, by comparison of the acid solution with Hazen (American Public Health Assn.) standards reading from 0 to 70.

By the process of the present invention there is obtained a chlorendic acid product having an extremely high degree of purity. This process is carried out while maintaining the chlorendic acid in the liquid state until the final product is recovered.

While there have been described various embodiments of the invention, the methods described are not intended to be understood as limiting the scope of the invention, as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for preparing a substantially pure chlorendic acid which comprises reacting maleic anhydride and hexachlorocyclopentadiene in a Diels-Alder condensation, in the presence of an organic solvent, forming a solution of an impure chlorendic acid anhydride in the organic solvent, adding to the said solution a concentrated aqueous solution of acetic acid, having a concentration of at least about 28 percent by wegiht, so as to hydrolyze the chlorendic acid anhydride to chlorendic acid, and form a solution of impure chlorendic acid in acetic acid, countercurrently contacting the resulting solution of impure chlorendic acid in the acetic acid with monochlorobenzene, thereby extracting the major portion of the impurities from the chlorendic acid into the monochlorobenzene, separating the chlorendic acid solution from the monochlorobenzene, diluting the chlorendic acid solution to an acetic acid concentration below about 28 percent by weight and, thereafter, crystallizing a purified chlorendic acid from the solution.

2. The process as claimed in claim 1 wherein the concentration of the acetic acid is about 40 percent by weight.

3. The process as claimed in claim 1 wherein the organic solvent used in the Diels-Alder condensation is monochlorobenzene.

4. The process as claimed in claim 2 wherein the organic solvent used in the Diels-Alder condensation is monochlorobenzene.

5. The process as claimed in claim 2 wherein a decolorizing agent is added to the diluted chlorendic acid solution prior to crystallizing the chlorendic acid from the solution.

6. A process for preparing substantially pure chlorendic acid which comprises reacting hexachlorocyclopentadiene and maleic anhydride in a Diels-Alder condensation in the presence of an organic solvent, forming a solution of an impure chlorendic acid anhydride in the organic solvent, adding a concentrated aqueous solution of acetic acid, having a concentration of at least about 28 percent by weight, to the chlorendic acid anhydride solution so as to hydrolyze the anhydride to an impure chlorendic acid and form a solution of impure chlorendic acid in acetic acid, countercurrently contacting the resulting solution of impure chlorendic acid in acetic acid with monochlorobenzene, thereby extracting the major portion of the impurities from the chlorendic acid into the monochlorobenzene, subjecting the resulting purified solution of chlorendic acid in acetic acid to distillation for a period of time sufficient to effect removal of substantially all of the monochlorobenzene from the chlorendic acid solution, recovering the monochlorobenzene from the distillate resulting from the distillation and returning the thus-recovered monochlorobenzene to that portion of the process wherein the monochlorobenzene is passed in countercurrent contact with the solution of impure chlorendic acid, subjecting the monochlorobenzene which has been passed in countercurrent contact with the impure chlorendic acid solution to a countercurrent contact with a concentrated acetic acid solution, thereby extracting any chlorendic acid dissolved in the monochlorobenzene into the concentrated acetic acid, returning the concentrated acetic acid containing the thus-extracted chlorendic acid to that portion of the process wherein the chlorendic acid anhydride is hydrolyzed, subjecting the thus-extracted monochlorobenzene to additional treatment to remove other impurities not extracted by the concentrated acetic acid and returning the thus-purified monochlorobenzene to that portion of the process wherein the monochlorobenzene is countercurrently contacted with the impure chlorendic acid solution, diluting the chlorendic acid solution obtained as a residue in the distillation step to an acetic acid concentration below about 28 percent by weight, adding to the thus-diluted chlorendic acid solution a decolorizing agent, removing the decolorizing agent from the diluted chlorendic acid solution, cooling the thus-obtained chlorendic acid solution so as to effect crystallization of chlorendic acid from the solution, separating the thus-obtained crystals of chlorendic acid from the solution and thereafter, drying the thus-separated crystals to remove the surface water therefrom and produce substantially pure crystals of chlorendic acid monohydrate.

7. The process as claimed in claim 6 wherein the chlorendic acid crystals are dried to a sufficient extent to remove both the surface water and the water of hydration so as to produce substantially pure crystals of anhydrous chlorendic acid.

8. The process as claimed in claim 6 wherein the organic solvent used in the Diels-Alder condensation is monochlorobenzene.

9. The process as claimed in claim 7 wherein the organic solvent used in the Diels-Alder condensation is monochlorobenzene.

10. The process as claimed in claim 6 wherein the concentration of the acetic acid used is about 40 percent by weight.

11. The process as claimed in claim 7 wherein the concentration of the acetic acid used is about 40 percent by weight.

12. The process as claimed in claim 8 wherein the concentration of the acetic acid used is about 40 percent by weight.

13. The process as claimed in claim 9 wherein the concentration of the acetic acid used is about 40 percent by weight.

14. A method for preparing a substantially pure chlorendic acid which comprises dissolving an impure chlorendic anhydride resulting from the reaction of maleic anhydride and hexachlorocyclopentadiene in a Diels-Alder condensation in the presence of an organic solvent, in a concentrated aqueous solution of acetic acid having a concentration of at least about 28 percent by weight, so as to hydrolyze the chlorendic acid anhydride to chlorendic acid and form a solution of impure chlorendic acid in acetic acid, countercurrently contacting the resulting solution of impure chlorendic acid in the acetic acid with monochlorobenzene, thereby extracting a major proportion of the impurities from the chlorendic acid into the monochlorobenzene, separating the chlorendic acid solution from the monochlorobenzene, diluting the chlorendic acid solution to an acetic acid concentration below about 28 percent by weight and thereafter crystallizing the purified chlorendic acid from the solution.

15. A process according to claim 14 wherein the concentration of the acetic acid is about 40 percent by weight.

16. A process according to claim 15 wherein a decolorizing agent is added to the diluted chlorendic acid solution prior to crystallizing the chlorendic acid from the solution.

References Cited

UNITED STATES PATENTS 2,752,361　6/1956　Robitschek et al. ___ 260—514 X

FOREIGN PATENTS 222,601　7/1959　Australia.
1,088,050　9/1960　Germany.

OTHER REFERENCES

Weissberger: "Technique of Organic Chemistry," vol. III (1950), p. 189.

LORRAINE A. WEINBERGER, *Primary Examiner.*

LEON ZITVER, *Examiner.*

R. K. JACKSON, V. GARNER, *Assistant Examiners.*